(No Model.)

9 Sheets—Sheet 1.

E. G. LATTA.
TYPE WRITING MACHINE.

No. 605,201. Patented June 7, 1898.

Witnesses:
Emil Neuhart.
Chas. F. Burkhardt.

Emmit G. Latta, Inventor.
By Wilhelm Bonner, Attorneys.

(No Model.) 9 Sheets—Sheet 2.

E. G. LATTA.
TYPE WRITING MACHINE.

No. 605,201. Patented June 7, 1898.

Witnesses:
Emil Neuhart.
Chas. F. Burkhardt.

E. G. Latta, Inventor.
By Wilhelm Bonner, Attorneys.

(No Model.) 9 Sheets—Sheet 4.

E. G. LATTA.
TYPE WRITING MACHINE.

No. 605,201. Patented June 7, 1898.

Witnesses:
Emil Neuhart.
Chas. F. Burkhardt.

E. G. Latta, Inventor.
By Wilhelm Bonner,
Attorneys.

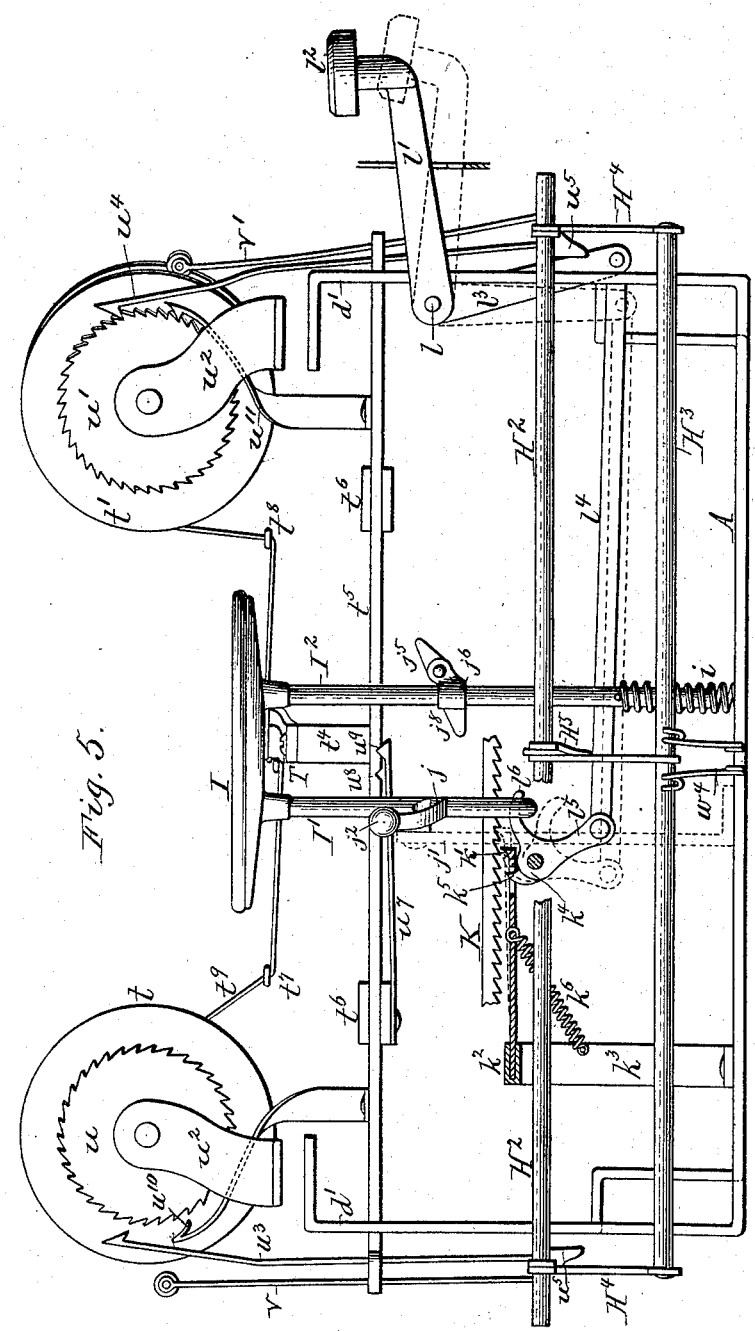

(No Model.) 9 Sheets—Sheet 6.
E. G. LATTA.
TYPE WRITING MACHINE.
No. 605,201. Patented June 7, 1898.
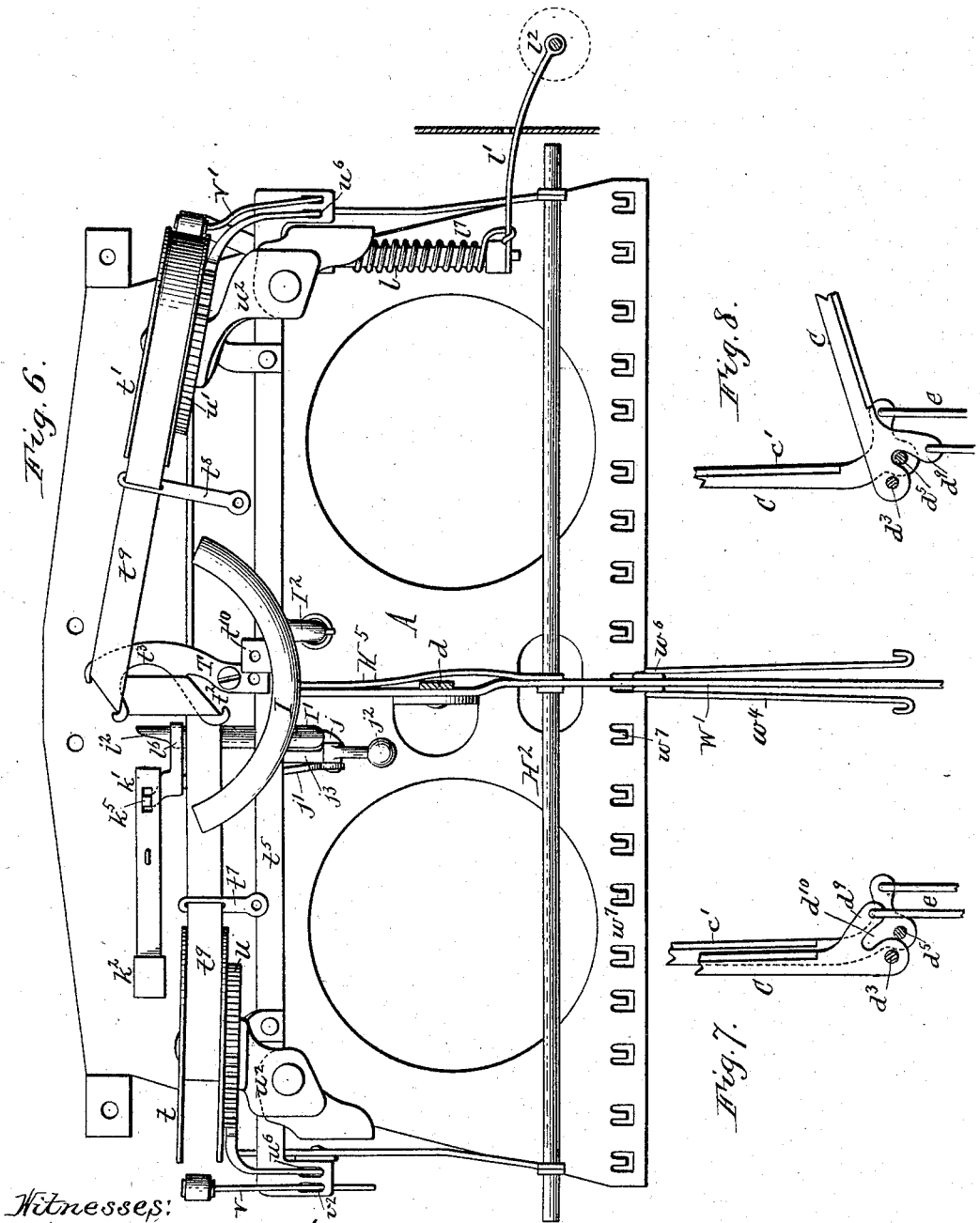
Witnesses:
Emil Neuhart.
Chas. F. Burkhardt.
Emmit G. Latta Inventor.
By Wilhelm Bonner Attorneys.
THE NORRIS PETERS CO., PHOTO-LITHO., WASHINGTON, D. C.

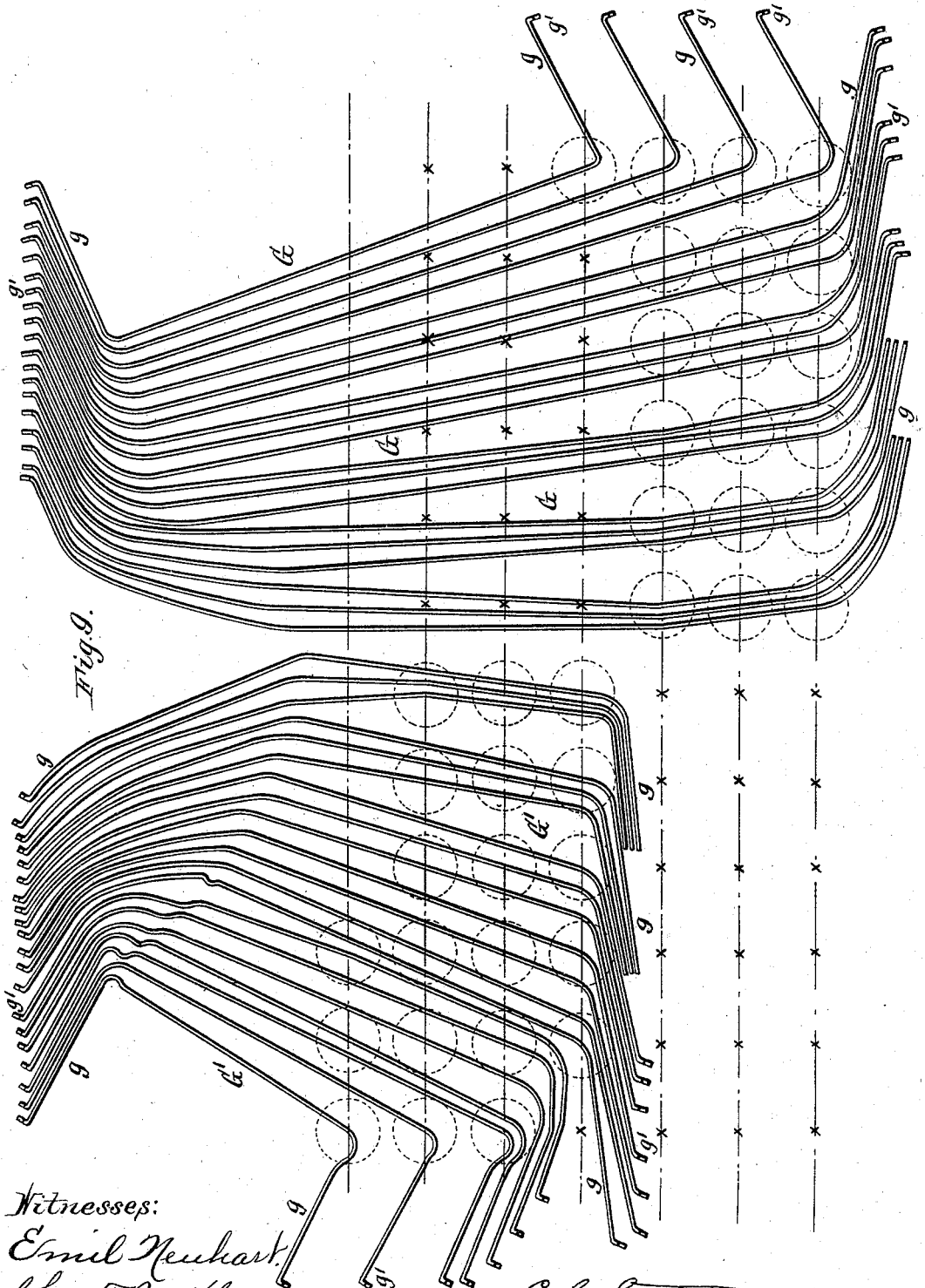

(No Model.) 9 Sheets—Sheet 8.
E. G. LATTA.
TYPE WRITING MACHINE.
No. 605,201. Patented June 7, 1898.
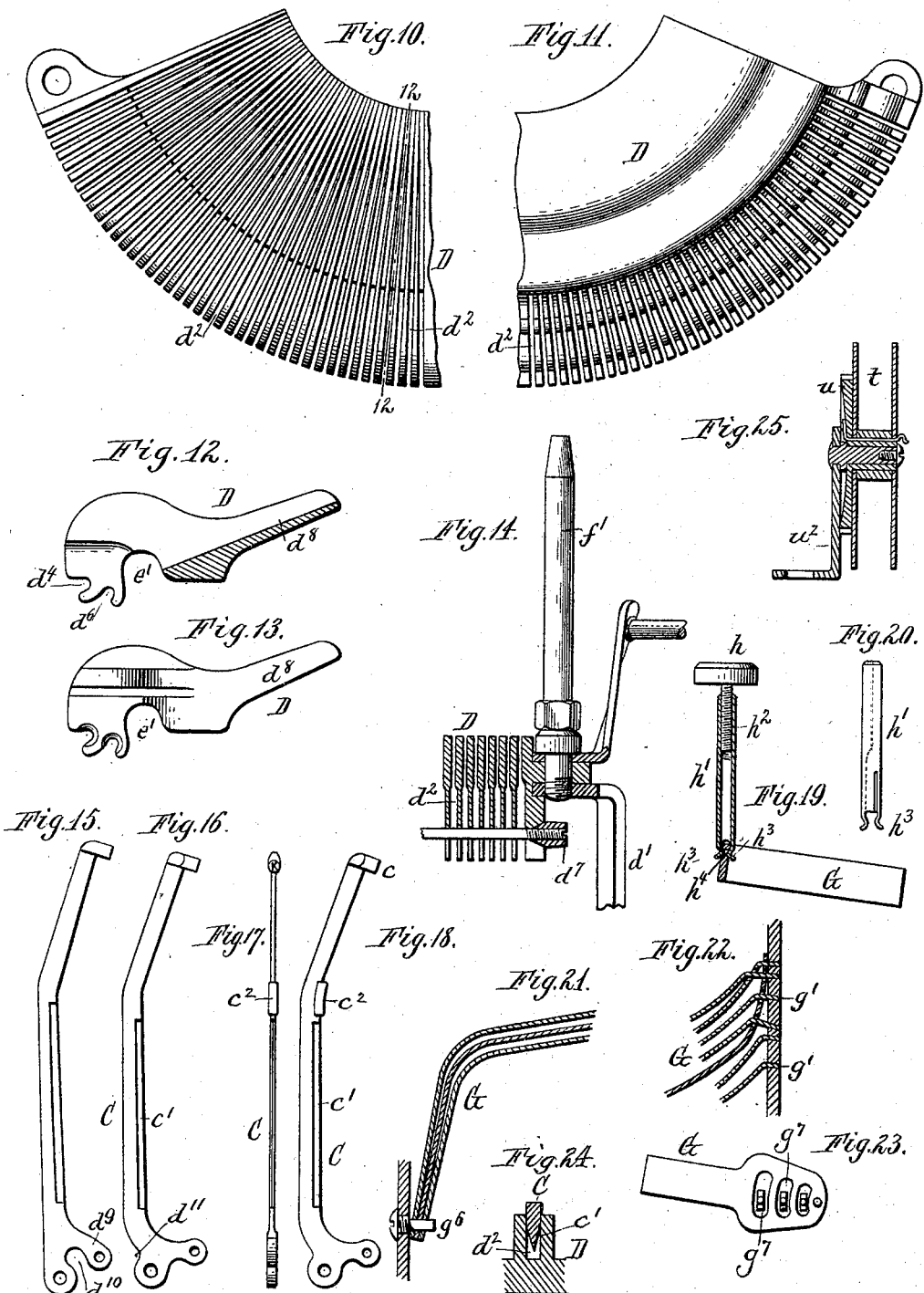

(No Model.) 9 Sheets—Sheet 9.

E. G. LATTA.
TYPE WRITING MACHINE.

No. 605,201. Patented June 7, 1898.

Witnesses: Emil Neuhart, Chas. F. Burkhardt
Inventor: Emmit G. Latta
By Wilhelm & Bonner, Attorneys.

THE NORRIS PETERS CO., PHOTO-LITHO., WASHINGTON, D. C.

UNITED STATES PATENT OFFICE.

EMMIT G. LATTA, OF FRIENDSHIP, NEW YORK.

TYPE-WRITING MACHINE.

SPECIFICATION forming part of Letters Patent No. 605,201, dated June 7, 1898.

Application filed May 13, 1893. Serial No. 474,097. (No model.)

*To all whom it may concern:*

Be it known that I, EMMIT G. LATTA, a citizen of the United States, residing at Friendship, in the county of Allegany, in the State of New York, have invented new and useful Improvements in Type-Writing Machines, of which the following is a specification.

This invention relates more particularly to type-writing machines of that class in which the types are carried by pivot-bars which are operated from horizontal key-levers by upright connecting-rods.

My invention has for its objects to produce a compact machine having comparatively few parts and in which the work is in sight of the operator, to so construct the machine that it can be operated at an increased speed, to secure a substantially uniform impression of all the characters, to provide the platen with convenient means for setting it back quickly and with certainty in making corrections, to improve the inking mechanism, and to improve the machine in various details of construction.

Figure 1:
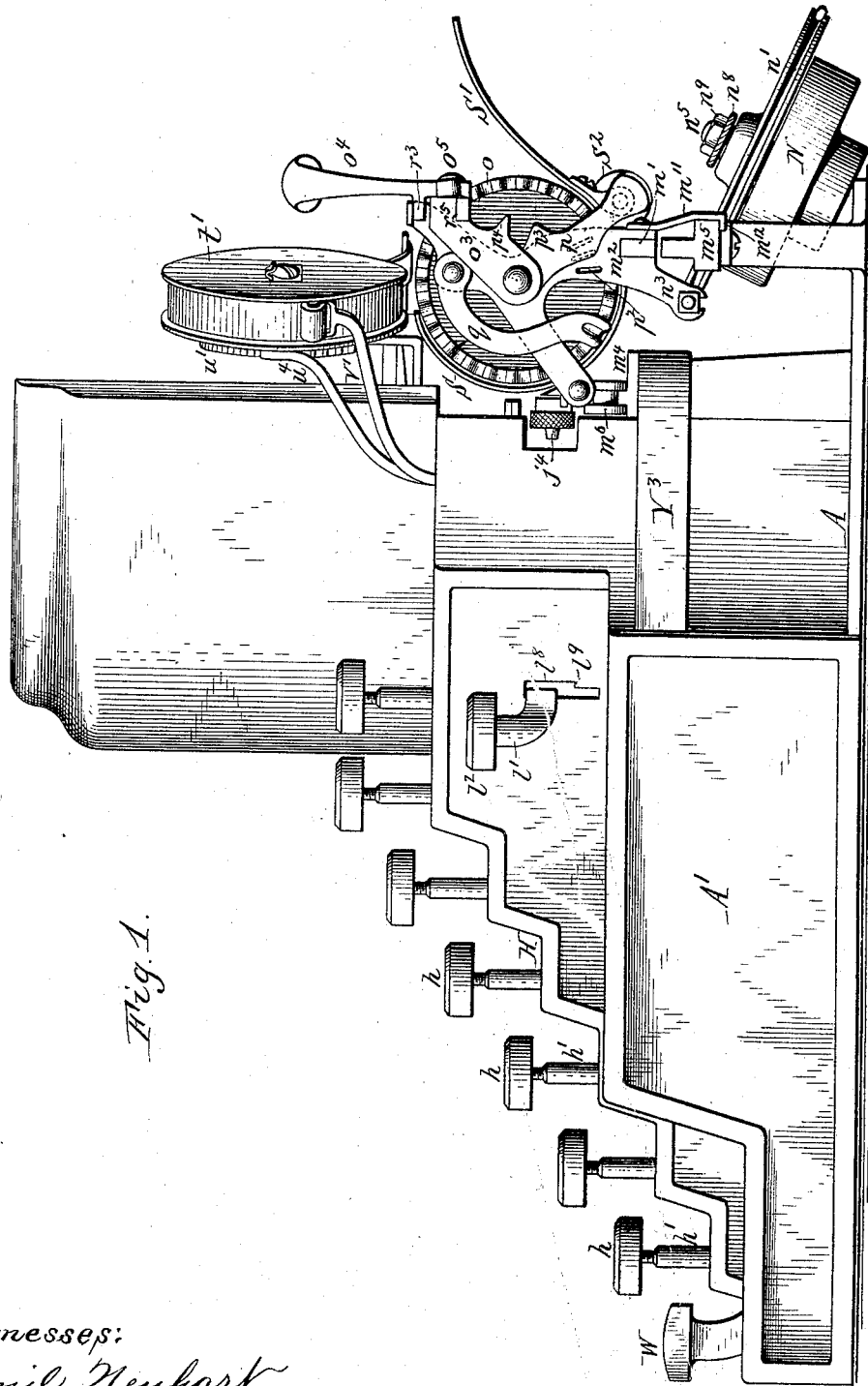
Figure 2:
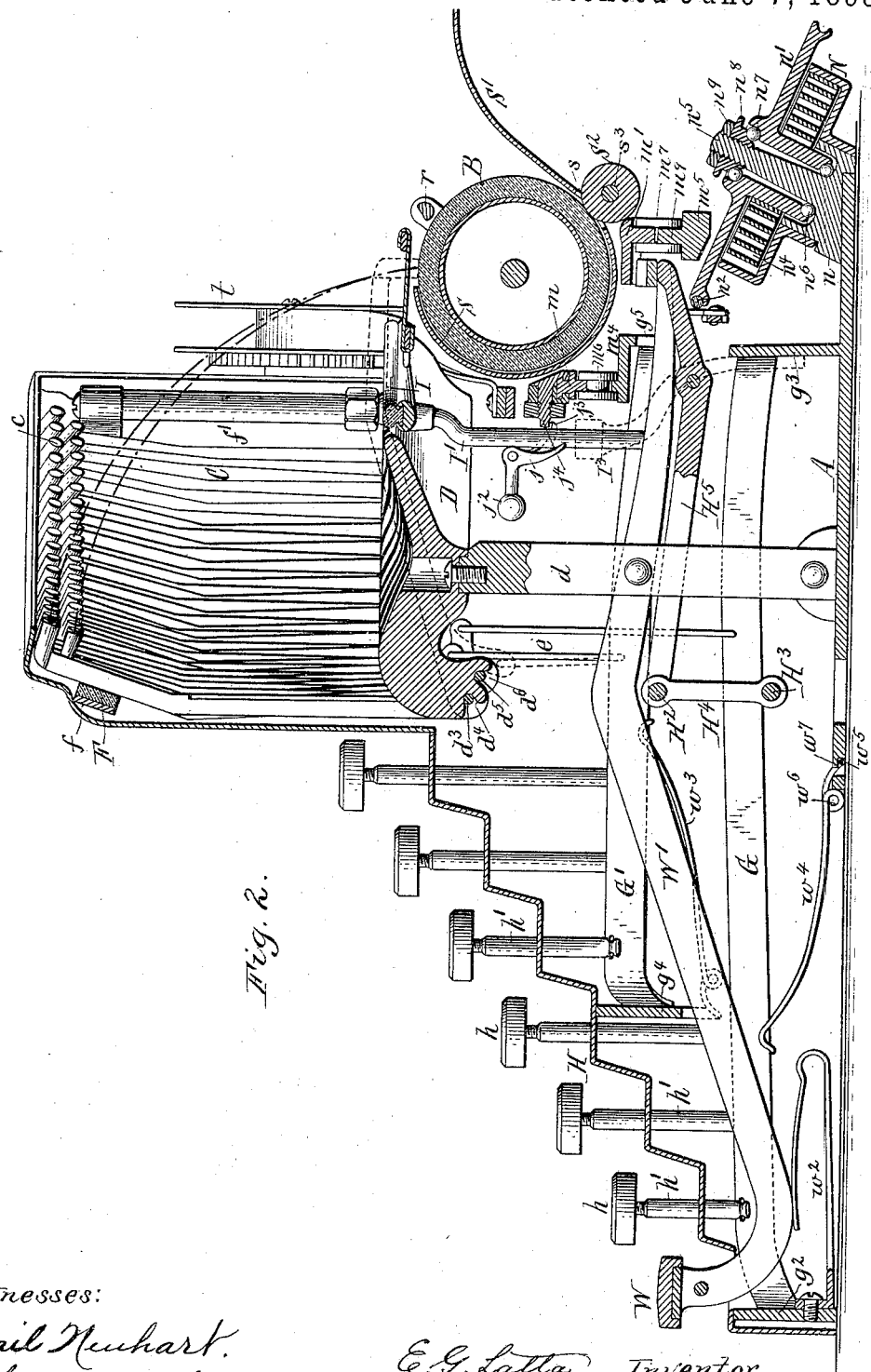
Figure 3:
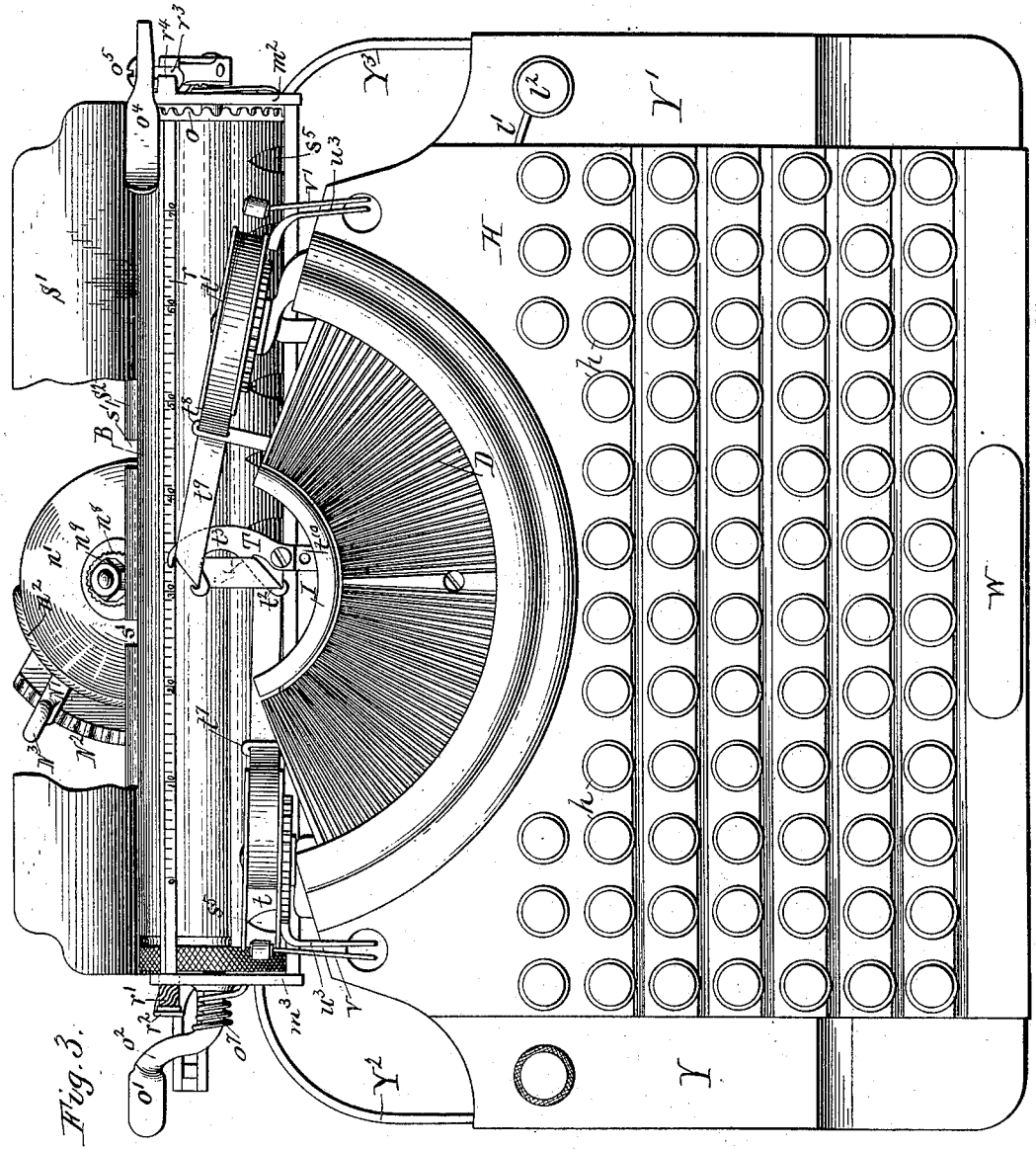
Figure 4:
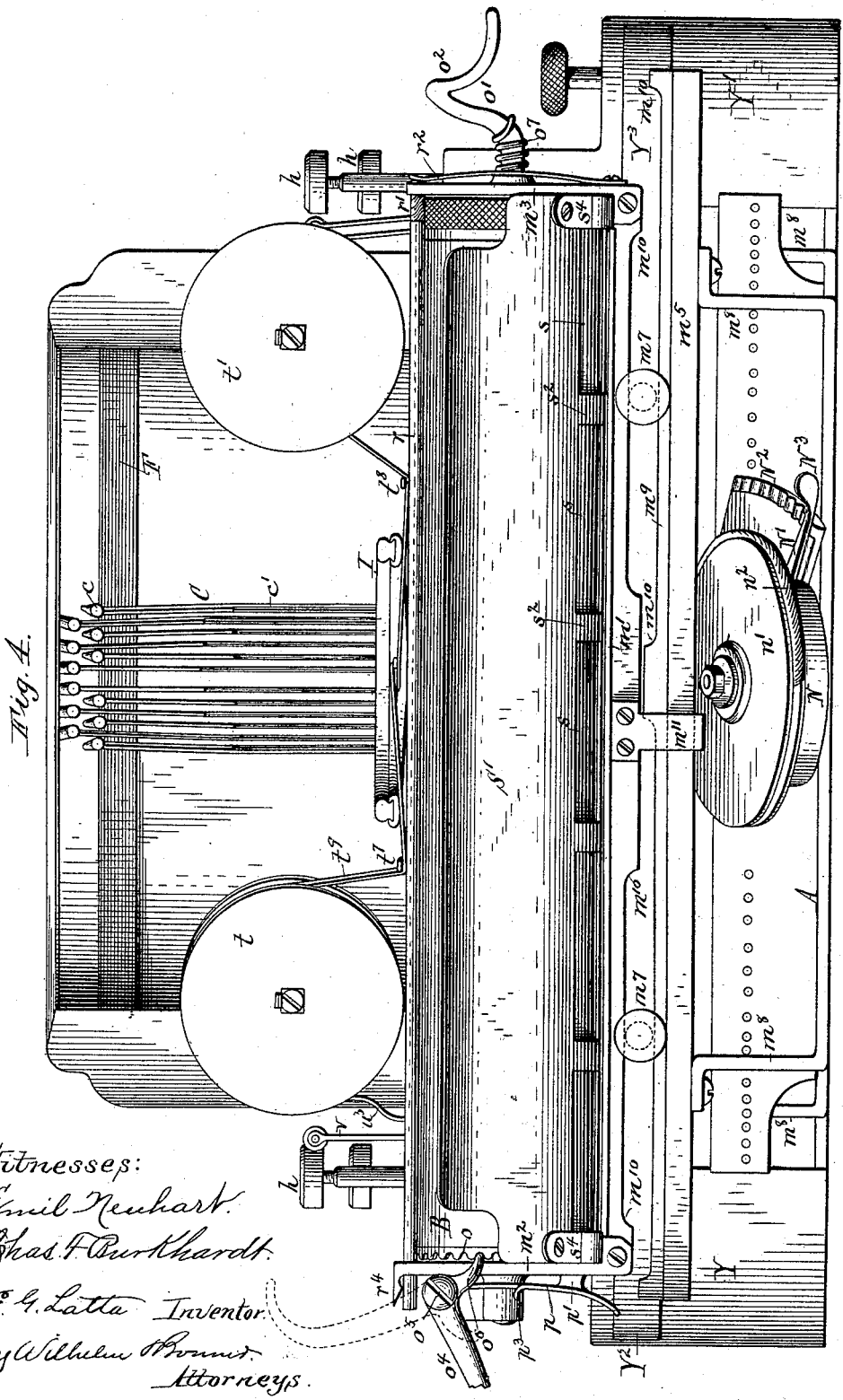
Figure 26:
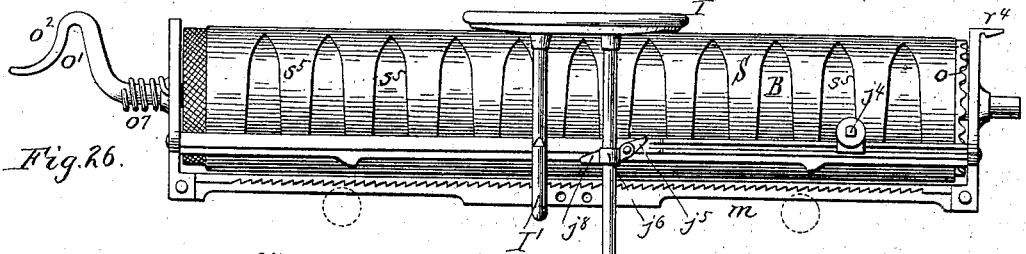
Figure 27:
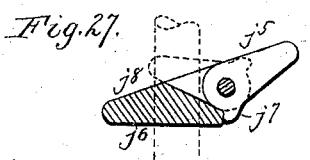
Figure 28:
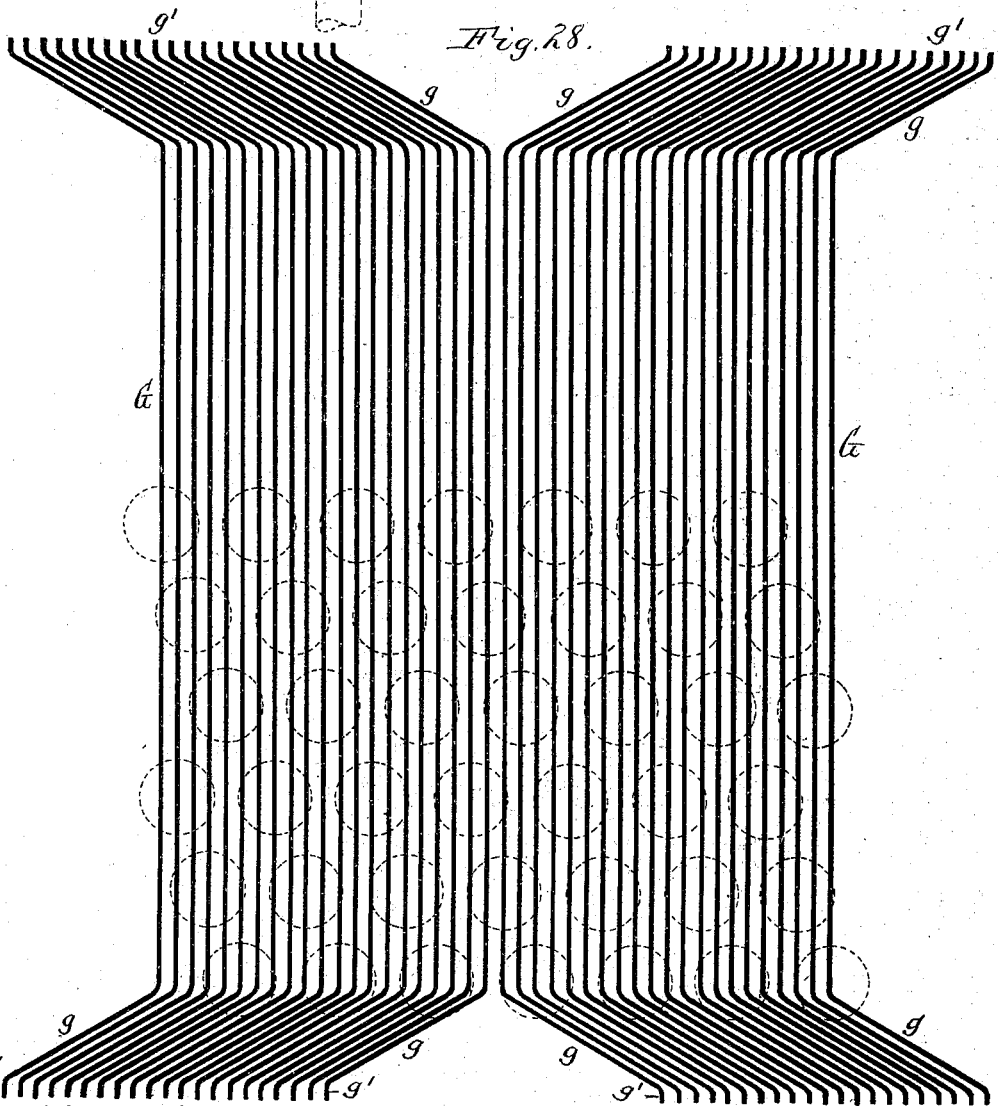

In the accompanying drawings, consisting of nine sheets, Figure 1 is a side elevation of the machine. Fig. 2 is a longitudinal sectional elevation thereof. Fig. 3 is a top plan view on a reduced scale, with a portion of the paper-shelf broken away to expose underlying parts. Fig. 4 is a rear elevation of the machine with the feed-roller and most of the type-bars omitted. Fig. 5 is a front elevation of the base-plate, universal bar, ribbon-feed mechanism, type-bar rebounder, and the devices for setting back the carriage. Fig. 6 is a top plan view of such parts. Fig. 7 is a detached view of two adjacent upper and lower type-bars, showing the same in their normal upright position. Fig. 8 is a similar view showing the upper bar depressed. Fig. 9 is a detached top plan view of the key-levers. Fig. 10 is a fragmentary top plan view of the type-bar guide-segment. Fig. 11 is a fragmentary bottom plan view thereof. Fig. 12 is a cross-section in line 12 12, Fig. 10. Fig. 13 is an end view of the guide-segment. Fig. 14 is a sectional elevation of one of the end portions of the guide-segment and adjacent parts. Fig. 15 is a side elevation of one of the long type-bars. Fig. 16 is a similar view of one of the short type-bars. Fig. 17 is a face view of a modified construction of the type-bars. Fig. 18 is a side elevation of such bar. Fig. 19 is a sectional elevation of one of the keys and its lever. Fig. 20 is a detached front elevation of one of the keystems. Fig. 21 is a fragmentary sectional elevation showing one manner of pivoting the front ends of the key-levers to the front frame of the machine. Fig. 22 is a sectional view showing another manner of pivoting the rear ends of the key-levers to the frame. Fig. 23 is an elevation of the inner portion of the longest lever shown in Fig. 22. Fig. 24 is a fragmentary vertical section of the type-bar segment and one of the type-bars on an enlarged scale. Fig. 25 is a cross-section of one of the ribbon-spools and its support. Fig. 26 is a detached front view of the carriage and the type-bar rebounder. Fig. 27 is a vertical longitudinal section, on an enlarged scale, of the device for automatically depressing the type-bar rebounder. Fig. 28 is a top plan view of a modified construction of the key-levers, the relative positions of the keys being indicated by dotted lines.

Like letters of reference refer to like parts in the several figures.

The stationary frame of the machine consists of a base-plate A and side walls A', secured to said base-plate.

B represents the platen arranged transversely at the rear portion of the machine, and C the type-bars, which are arranged in an upright position in front of the platen and carrying at their upper free ends the types *c*, which strike the upper surface of the platen. These type-bars are arranged in the form of a semicircle and are pivoted at their lower ends to a horizontal guide-segment D in such a manner that all the types strike a common center. As shown in Figs. 15 and 16, each of these type-bars is made comparatively thick at its pivot end, while its middle portion is thinner and beveled on its front side for about two-thirds of its length, as shown at *c'*. The pivot portion of the bar is preferably hardened to reduce wear, and the remaining portion is drawn to a spring temper.

The guide-segment D is arranged in front of the platen and is supported at its middle by a standard *d* (shown in Fig. 2) and at its ends by side standards *d'*, rising from the base of the machine, as shown in Figs. 5 and 14. The type-bars are pivoted to the lower outer portion of this segment and consist of a series of long bars and a series of shorter bars alternating with the long bars. The type-segment is provided in its outer portion with radial slots $d^2$, in which the lower ends of the type-bars are guided and which are made narrow at their upper portions to fit the thin portions of the type-bars and widened at their lower outer portions to fit the thickened parts of the bars, as shown in Fig. 14. The pivots of the long type-bars are arranged in front of those of the short type-bars and in a slightly-higher plane, as shown in Fig. 2, and each series of bars is preferably hung upon a continuous pivot-wire extending from end to end of the segment. The upper pivot-wire $d^3$ is seated in a groove or depression $d^4$, formed in the adjacent under side of the segment, and the lower pivot-wire $d^5$ is arranged in a similar groove $d^6$, arranged in rear of the groove $d^4$, both of which grooves intersect the radial slots of the segment. These pivot-wires pass through the pivot-holes of the bars and are secured in place by conical nuts $d^7$, applied to the ends of the wires and seated with their conical inner portions in correspondingly-shaped sockets formed in the ends of the segment, as shown in Fig. 14. This construction permits the pivot-wires when worn to be adjusted lengthwise to bring unworn portions thereof in the pivot-holes of the type-bars, the wires being shifted by loosening the nut at one end thereof and tightening the nut at its opposite end. When necessary, a new pivot-wire may be readily substituted for a worn one at trifling cost.

The guide-segment is formed at its inner portion with an upwardly-extending flange $d^8$ and provided in its upper side with radial grooves, forming continuations of the slots $d^2$. The beveled or V-shaped front edges of the type-bars follow these grooves when depressed and are thereby accurately centered and kept in direct line with the printing-point. This construction also causes less vibration of the type-bars than do the guides heretofore employed.

The actuating or crank arms $d^9$ of the outer or long type-bars are notched or recessed on their under side, as shown at $d^{10}$ in Figs. 7, 8, and 15, to enable such arms to clear the pivot-wire of the inner or shorter type-bars when the outer bars are depressed, as shown in Fig. 8, and the inner type-bars are recessed on their rear sides opposite the pivot-wire of the outer bars, as shown at $d^{11}$, Fig. 16, to permit such type-bars to clear said pivot-wire and stand upright between the outer type-bars, as shown in Fig. 7. The upper ends of the short type-bars are beveled on their rear side, as shown in Figs. 4 and 16, to facilitate the entrance of such bars between the adjoining longer type-bars and prevent their catching against the same.

$e$ represents the upright rods or wires whereby the crank-arms of the type-bars are connected with the key-levers. The upper ends of these connecting-wires are provided with the usual hooks, which pass through openings in such crank-arms, and the guide-segment D is formed in its under side in rear of the pivot-wire grooves $d^4$ $d^6$ with a downwardly-opening recess or groove $e'$, which receives the hooked ends of the connecting-wires.

By arranging the type-bars as shown and constructing them of different lengths the type-sockets at the upper ends of the row of short bars stand between the reduced portions of the bars of the outer row, and the hooks of the inner row of connecting-wires $e$ are located on the inner side of the hooks of the outer row of such wires, thereby affording sufficient room for both sets to work freely without interference and bringing the type-bars into a smaller space.

In order to enable the operator to obtain a clear view of the work, the upper surface of the platen is preferably arranged above the plane of the type-bar pivots, as shown in Fig. 2, and the upper portions of the type-bars are offset or bent rearwardly at an angle to their lower portions, as shown in Fig. 2, so that when a bar is depressed, as shown by dotted lines in said figure, its rear portion is substantially horizontal, while its front portion inclines forwardly toward its pivot. This arrangement materially shortens the stroke of the type-bars and affords a better and more convenient view of the printing-point.

F represents a back-stop which is arranged on the rear side of the type-bars, near their upper ends, and against which the bars rest when in their normal upright position and whereby their backward movement is limited. This back-stop is curved to conform to the semicircular arrangement of the type-bars and consists of a cushion of rubber or other soft material, which is secured to the inner side of a metallic supporting-strip $f$. This supporting-strip is supported at its ends upon the upper ends of posts or vertical bolts $f'$, secured at their lower ends to the guide-segment D and side standards $d'$, as shown in Figs. 2 and 14.

G represents a lower series or bank of key-levers by which the long type-bars are operated, and G' represents an upper series or bank of key-levers by which the short type-bars are operated. The key-levers of the upper bank are shorter than those of the lower bank and are arranged in two groups, one on each side of the longitudinal center line of the machine. The key-levers of the lower bank are likewise arranged in two groups on opposite sides of such center line, and all the levers diverge forwardly. The diagram Fig. 9 shows a group of short key-levers on the left-hand side of the machine and a group of long key-levers on the right-hand side of the machine, the two remaining groups being omitted and the position of the keys of such omitted levers being indicated by the small crosses.

Each key-lever consists of a strip of metal having its end portions offset or bent at an angle to the body of the lever, as shown at $g$, and most of the levers—namely, those nearest the sides of the machine—are formed at both ends with integral pivots $g'$, upon which the levers swing. The front ends of the long key-levers having such pivots are journaled in an upright cross-bar $g^2$ at the front of the machine, while their rear pivots are journaled in a similar cross-bar $g^3$ at the rear of the machine, as shown in Fig. 2, such cross-bars being provided with pivot-holes into which the pivots of the key-levers are sprung. The short key-levers having integral pivots at both ends are journaled in a similar manner in front and rear cross-bars $g^4$ $g^5$. Owing to the greater degree of divergence of the remaining key-levers it is necessary to pivot some of them at very nearly the same place, and for this reason such adjoining key-levers as will not permit the use of integral pivots are mounted upon a single pivot $g^6$, as shown in Fig. 21, or, if desired, some of the levers may be flattened at their ends and journaled upon the pivot of one of the other lever-pivots and formed with concentric slots $g^7$, through which the adjacent levers pass, as shown in Figs. 22 and 23. The several key-levers are properly formed to locate the portion thereof to which the connecting-wires are attached directly underneath the crank-arms of the respective type-bars, and the offset end portions of the levers may have any desired curvature which permits them to compactly nest together, it being only necessary that the pivots are substantially parallel with a line extending through the points where power is applied to and transmitted from the levers. The connecting-wires $e$ are attached at their lower ends to the key-lever by hooks or other suitable connections.

My improved key-lever has the advantages that power may be applied to it or taken therefrom equally well at any point along its longitudinal body. Each key receives the same stroke and the slight spring or resilience of the levers produces a peculiarly elastic and easy touch. By the diverging arrangement of the levers power is applied to the type-bars without cross strains and less wear of the several connections is produced.

In the modified form of the key-levers shown in Fig. 28 the levers are all alike, except the location of the holes in the same for the connecting-wires and the key-stems, and the keys are arranged in the usual diagonal lines from front to rear of the keyboard. This construction is suitable for a less expensive machine and has the same advantages as the levers first described.

H is the plate or board which covers the key-levers and which is stepped or banked in the usual manner and secured to the main frame of the machine.

$h$ are the keys, and $h'$ the stems thereof, which pass through openings in the cover H and are attached at their lower ends to the key-levers. The keys may be constructed of any desired material. As shown in Fig. 19, each key is provided with a screw-threaded shank $h^2$, which engages in an internal thread formed in the upper portion of the stem $h'$, which latter is tubular. This stem is formed of sheet metal and has its meeting edges on its rear side, as shown by dotted lines in Fig. 20. The front side of the stem is split for a short distance from its lower end upward, as shown in the last-mentioned figure, and the stem is formed at its lower end with a pair of open jaws or catches $h^3$, which extend downward from the stem and which are sprung into an opening $h^4$ in the key-lever from opposite sides thereof, as shown in Fig. 19. The lower portion of the joint in the rear side of the tubular stem is offset, so as to be over one edge of the key-lever, while the front slit of the stem is arranged to stand opposite the outer edge of the lever, so that the portion of the lower end of the stem resting on the key-lever is solid. The stems with the keys can be readily detached from the key-levers by using sufficient force to spring apart the jaws of the stems. These jaws are bent or indented to form projections which enter the opening in the key-lever, and their lower ends are flared to facilitate their engagement with the levers. The keys of each row are adjusted to the same level by screwing the key-shanks up or down in the tubular stem. The split stems grasp the key-shanks with sufficient force to hold them from turning in the stems in the ordinary use of the machine. This construction avoids the use of turnbuckles on the connecting-wires $e$ and permits the keys to be adjusted more easily.

The universal bar or frame whereby the usual intermittent feed or escape device of the platen-carriage is operated consists of an upper cross bar or rod $H^2$, arranged underneath the upper bank of key-levers, and a lower rod $H^3$, arranged underneath the lower bank of key-levers and suspended from the upper rod by hangers or links $H^4$. The upper bar of the universal frame is connected with the front arm of a longitudinal lever $H^5$, whose rear arm operates the escapement mechanism of the carriage-feed. This feed or escapement mechanism may be of any ordinary construction and forms no part of my invention.

I represents a yielding rebounding device arranged to intercept the final portion of the downward stroke of the type-bars, whereby the latter, while being allowed to strike the platen for delivering the impression, are instantly caused to recede or rebound from the platen upon striking it, thereby permitting the platen-carrier to be fed at the end of the downward stroke of the type-bars instead of during their return stroke and increasing the speed of the machine correspondingly without liability of blurring the work.

The rebounder I consists of a segmental cushion of soft rubber or other yielding and non-sonorous material arranged horizontally in front of the platen slightly above the level of its upper surface, so that the type-bars on being depressed strike the rebounder the instant before they come in contact with the platen. The momentum of the type-bar causes it to compress the rebounding cushion sufficiently to deliver the impression on the platen, and the quick reaction of the expanding cushion instantly forces back the bar before the carriage advances, whereby blurring or smutting of the work is obviated, the carriage from its greater weight being prevented by inertia from advancing before the type-bar rebounds. To give the type-bars the necessary momentum to compress the rebounding cushion, a quick touch of the keys is required, and this, in connection with the quick return of the type-bar to its normal position and the more rapid carriage-feed referred to, renders the machine capable of a very high speed. By constructing the rebounder of soft rubber or other non-sonorous material having the requisite elasticity the noise produced by metallic springs or other hard rebounding devices is obviated. This rebounder or buffer, in addition to its function described, may, by a peculiar construction of the type-bar, also be used for equalizing the blow of the types against the paper on the platen, so as to prevent characters of small area—such as the period, comma, colon, and semicolon—from puncturing the paper. For this purpose each type-bar carrying such a small character is formed at the point where it strikes the rebounder with a widened contact-face or enlargement $c^2$, as shown in Figs. 17 and 18, which increases the contact-surface of the bar with the platen and reduces the force of the blow correspondingly. These enlargements are graduated or proportioned to the area of the characters on the type-bars, the bars bearing the period and the comma having a wider enlargement than the bars bearing the colon or semicolon, while the bars bearing the smallest lower-case letters have only slight enlargements. This provision permits a substantially uniform touch of all the keys without perforating the paper or the inking-ribbon.

The type-rebounder is preferably made vertically movable and so combined with the platen-carriage that in case the operator fails to notice the usual alarm which is sounded when the end of the line is reached the rebounder is automatically raised above the elevation at which it permits the type-bars to strike the platen, thus intercepting the type-bars and preventing overprinting. The rebounder is accordingly supported by two posts or uprights $I'$ $I^2$, connected at their upper ends by a curved bar, to the upper side of which the rebounder or buffer is secured, preferably, by a dovetail connection. These posts are arranged to slide vertically in bearings formed in brackets secured to the main frame underneath the rebounder, one of such brackets being shown by dotted lines at $I^3$ in Fig. 2. As shown in Fig. 5, one of these posts extends nearly to the base of the machine, and to its lower portion is applied a spiral spring $i$, which is compressed in the normal position of the rebounder, so as to have a tendency to raise the same. The upper end of this spring bears against a pin secured to said post, while its lower end rests upon the base of the machine.

$j$ is a pawl for holding the rebounder down in its normal position. This pawl is pivoted to the upper end of a standard $j'$, rising from the base, as shown by dotted lines in Fig. 5, and engages in a notch formed in the adjacent side of the short post $I'$, as shown in Fig. 2, the lower side of the notch being abrupt and its upper side beveled and the pawl having a weighted arm $j^2$ for causing it to swing in engagement with the notch by gravity. The pawl is provided with a rearwardly-extending trip-arm $j^3$, arranged on one side of the post $I'$, and beveled on its front side, as shown in Fig. 2. In its normal position this trip-arm projects into the path of the usual alarm trip or projection $j^4$, arranged on the front side of the platen-carriage for actuating the hammer of the alarm-bell, so that in case the operator does not observe the usual alarm the projection on the carriage trips the releasing-arm of the detent $j$ just before the carriage reaches the limit of its movement, thereby disengaging the detent from the notched supporting-post of the rebounder and allowing the spring $i$ to raise the same above its normal position, in which it intercepts the type-bars and prevents them from reaching the platen, and thus obviating overprinting. The alarm-bell and its hammer are not shown in the drawings and may be of any ordinary construction. The bell-trip $j^4$ is made adjustable lengthwise of the carriage in a common manner and the detent of the rebounder-post is so arranged that it is caused to release the rebounder, and thus discontinue the effective strokes of the type-bars as soon as the end of a line is reached.

$j^5$ is an incline arranged on one of the supporting-posts of the rebounder, whereby the latter, when elevated abnormally, is automatically depressed sufficiently to engage with its locking-pawl upon drawing the carriage back to its initial position for writing a new line. This incline is arranged on a bracket $j^6$, secured to the post $I^2$ of the rebounder and consists of a tooth pivoted to the bracket in such a manner that when the rebounder is raised it yields to the bell-trip $j^4$ and allows the same to pass freely over it during the forward movement of the carriage and so as to act as a rigid inclined tooth during the backward movement of the carriage, thereby causing the trip in riding over the tooth to depress the rebounder sufficiently to cause the pawl $j$ to engage with the locking-notch of the rebounder. As shown in Fig. 27, this inclined tooth is formed with a nose or shoulder $j^7$, which limits its rearward swing beyond the position shown by full lines in said figure.

$j^8$ is a stationary inclined guide arranged on the side of the bracket $j^6$, opposite the yielding tooth and forming a continuation of the latter. During the forward movement of the carriage the trip $j^4$ swings the inclined tooth $j^5$ aside, as shown by dotted lines in Fig. 27, and the tooth does not, therefore, interfere with the forward feed of the carriage, while during the backward movement of the carriage the trip $j^4$ rides up the inclined guide $j^8$ and swings the inclined tooth into the position shown in Fig. 26 and by full lines in Fig. 27, when the further swinging movement of the tooth is limited and the rebounder is depressed by the trip riding over the tooth.

If desired, the alarm-bell may be omitted, as shown, and the vertically-movable rebounder be employed alone for preventing overprinting.

K is the usual rack-bar of the carriage, and $i^2$ is an arm extending backwardly from the lower end of the short supporting-post I' and terminating in a tooth which engages with the rack-bar when the rebounder is abnormally raised, and thereby arrests the movement thereof. This provision permits the machine to be used for practice without necessarily wearing the carriage-feed and the ribbon mechanism, and as the rebounder alone receives the blow when thus raised the noise of striking the platen is avoided. Strains on the pivots and connections of the type-bars are also prevented.

The rebounder, when elevated, may be depressed by hand by the following mechanism:

$l$ is a longitudinal rock-shaft arranged on the right-hand side of the machine and supported in suitable bearings, (not shown,) and $l'$ is a laterally-extending rock-arm secured to the front end of said shaft and provided at its outer end with a key $l^2$. $l^3$ is a depending arm secured to the rear end of said rock-shaft and connected by a rod $l^4$ with the lower end of a bell-crank or elbow lever $l^5$. This lever is pivoted to swing transversely of the machine, and its upper arm $l^6$ is made hook-shaped and overlaps the rearward extension of the supporting-post I', as shown in Figs. 5 and 6, so that upon depressing the key $l^2$ the elbow-lever is caused to depress said post and the rebounder carried by it to their normal position, the gravity-pawl engaging automatically with the notch of the post and holding it in this position. The key $l^2$, upon being released, is turned to its former position by a torsional spring $l^7$, surrounding the rock-shaft $l$ and secured at one end to the key-arm $l'$ and at its other end to the rear bearing of the shaft. This device permits the buffer to be depressed after being elevated and enables one or more characters to be printed beyond the ordinary limit of the carriage if it is desired to complete a word.

Referring to Fig. 5, $k'$ represents a pawl for setting back the carriage to make corrections. This pawl is arranged horizontally underneath the rack-bar K and slides lengthwise of the latter in a guide $k^2$, formed at the upper end of a standard $k^3$. The pawl-arm consists of a strip of spring metal having at its free end a tooth which is adapted to engage with the teeth of the rack-bar. The spring-pawl assumes normally a horizontal position, in which its tooth clears the rack-bar, as shown by full lines in Fig 5.

$k^4$ is a cam formed on the hub of the elbow-lever $l^5$ under the free end of the pawl $k'$, whereby the latter is lifted into engagement with the rack-bar during the first portion of the movement of the elbow-lever.

$k^5$ is a shifting spur or projection also arranged on the hub of the elbow-lever and engaging in a slot formed in the front end of the pawl, so that the latter, after being engaged with the rack-bar by the cam $k^4$, is moved backwardly by the spur and caused to set back the rack-bar and platen-carriage correspondingly. The carriage can thus be quickly set back by simply depressing the key $l^2$ without the care required in moving back the carriage by seizing it. $k^6$ is a spring whereby the pawl $k'$ is retracted to its former position when disconnected from the rack-bar K and which is secured at its upper end to the pawl and at its lower end to the standard $k^3$.

As shown in Figs. 1, 5, and 6, the lever $l'$ of the set-back key passes through an upright slot $l^8$, formed in the adjacent side wall of the machine. This slot is preferably made of such length as to arrest the downward stroke of the lever when the carriage is set back a full letter-space, and in order to enable the carriage to be set back but half a space for crowding a letter between two others, if desired, the slot is contracted at its lower portion to form a shoulder $l^9$ for arresting the stroke of the lever at the proper point to shift the carriage back only half a space. To accomplish this, the lever is pressed backward in depressing it, so as to bring it over the shoulder, while when it is desired to set back the carriage a whole space the lever is depressed in a straight line to clear said shoulder. The carriage may be moved back more than one space by repeatedly depressing the set-back key, and by providing this means for setting it back half a space the small characters may be written in half the usual space by depressing the set-back key alternately with the ordinary keys, or, in other words, by depressing the set-back key once before depressing the next ordinary key. In writing with half-spaces the set-back key must be held down until the character is printed, when it is again released.

The lowering devices of the buffer or rebounder and the set-back devices are so arranged and proportioned that upon depressing the set-back key against the stop-shoulder $l^9$ the carriage is set back only half a space and advances to its formed position on releasing said key, so that the rebounder when elevated is lowered sufficiently to interlock with its detent.

The platen-carriage consists of a horizontal rail $m$, arranged on the front side of the platen, a similar rail $m'$, arranged on the lower rear side of the platen, and end plates $m^2$ $m^3$, secured to the ends of said front and rear rails.

$m^4$ is a stationary transverse track-rail arranged underneath the front carriage-rail $m$. $m^5$ is a similar stationary track-rail arranged underneath the rear carriage-rail, and $m^6$ $m^7$ are antifriction-rollers running upon the track-rails and supporting the carriage-rails. The front and rear track-rails are supported by standards $m^8$, secured to the base of the machine, as shown in Fig. 4. The rear track-rail is formed on its upper side with a longitudinal rib or tongue $m^9$, and the rear carriage-rail is formed on its under side with a similar tongue. Each of the rear rollers $m^7$ is provided centrally with a peripheral groove forming flanges of larger diameter than the intermediate body portion of the roller. The tongues of the adjacent upper and lower rails are made to fit closely between the flanges of these rollers, and the tongue of the rear carriage-rail is deeper than the flanges of the rollers, so that the tongue of said upper rail bears upon the reduced body of the rollers, and the flanges of the rollers clear the base portion of said rail, as shown in Fig. 4, the only bearing-surface of the upper rail being its tongue. The tongue of the rear track-rail acts simply to guide the rollers, but does not sustain their weight. The flanges of the rollers run upon the base portion of the rear track-rail on opposite sides of its tongue. The carriage thus runs back and forth freely on the rollers, and the latter run without pivot-friction, so that they require no oiling. The track and carriage rails are provided near both ends and near their middle, as shown in Fig. 4, with curved shoulders $m^{10}$, forming stops which limit the movement of the rollers in the slots formed between said rails and keep the rollers in their proper places. These stops are so arranged relatively to the different diameters of the rollers that the stops do not come in contact with the rollers except at the extremities of the carriage movement. In case a roller slips out of place one of the stops will strike it during the first portion of the carriage movement and force it back to place, the roller acting merely as a pivoted roller when so shifted. By this arrangement of the roller guides and stops a roller is at all times on each side of the middle of the track-rail and the middle of the carriage is always located between the rollers. The front carriage and track rails and the guide-roller are similar in construction and arrangement to those above described, except that the roller is smaller and its body portion or smaller diameter bears upon the tongue of the track-rail and its flanges run in contact with the base of the front carriage-rail, so as to cause the carriage to move a greater distance over the roller than the roller moves over the track-rail, and thereby support the front portion of the carriage as near to its middle as possible. This manner of supporting the carriage, while reducing friction, maintains the front roller within about one inch and a quarter of the printing-point, being an important advantage over a pivoted roller moving the same distance as the carriage.

$m^{11}$, Figs. 1 and 4, represents a retaining-bar depending from the rear rail of the carriage and provided at its lower end with an inwardly-extending lip $m^{12}$, which engages under the rear track-rail. This retaining-bar prevents upward displacement of the carriage. The carriage may, however, be removed by detaching this bar.

N is the spring-barrel of the carriage, arranged at the rear of the machine below the carriage and provided at its lower end with a collar whereby it turns upon an arbor formed on a base $n$, secured to the base-plate of the machine, a shoulder being formed on said arbor, against which the lower end of said collar abuts.

$n'$ is a grooved pulley arranged over the closed end of the barrel, and $n^2$ the connecting-cord, attached at one end to the pulley and at its other end to an arm $n^3$, arranged at the adjacent end of the carriage. $n^4$ is the coiled spring, arranged in the barrel and secured at its outer end to the barrel and at its inner end to the hub of the pulley.

$n^5$ is a stud or spindle extending upward from the base $n$ and passing through the hub of the pulley $n'$. The base is provided around the lower end of the stud with an annular ball-groove, and the hub of the pulley is provided in its adjacent end with a similar groove, the two grooves forming a channel in which is arranged a row of balls $n^6$.

$n^7$ is an upper row of balls seated in an annular chamber formed partly in the upper end of the pulley-hub and partly in an adjustable bearing-case $n^8$, having an internal screw-thread which engages with an external thread formed at the upper end of the stud $n^5$, whereby the ball-bearing of the pulley may be adjusted to compensate for wear.

$n^9$ is a lock-nut applied to the upper end of the arbor $n^5$ and bearing against the adjustable case $n^8$.

N' is a tensioning-arm projecting from the spring-barrel N and engaging with a segmental ratchet-bar $N^2$, secured to the base $n$, as shown in Figs. 3 and 4, whereby the barrel is held against turning. By shifting this arm toward one or the other end of the ratchet-bar the barrel is turned and the tension of its spring is increased or diminished accordingly. The tensioning-arm preferably consists of a flat spring having a thumb-piece $N^3$ for shifting it.

The platen is of the usual cylindrical form and provided at one end, preferably its right-hand end, with a ratchet or crown wheel $o$. It is supported in the carriage by a longitudinal shaft or axle, on which it turns freely and which is journaled at its end portions in the end plates $m^2$ $m^3$ of the carriage. The left-hand end of the shaft is bent upwardly and backwardly and then downwardly and outwardly to form a crank $o'$ for turning the platen-shaft, which is done by pressing downward upon the end of the crank. The carriage may at the same time be shifted toward the right by pressing against the offset $o^2$ of the crank.

$o^3$ represents a radial arm secured at its inner end to the right-hand end of the platen-shaft, and $o^4$ is a shifting-lever fulcrumed on the free end of said radial arm by a pivot $o^5$, arranged at right angles to this platen-shaft. This lever is formed on the inner side of its pivot with a downwardly-extending pawl $o^6$, which engages with the teeth of the ratchet or crown wheel of the platen. The shifting-lever extends laterally from its pivot, and its outer portion is bent upwardly in the form of an open hook, which may be conveniently grasped for pulling the carriage toward its starting-point. Upon depressing the shifting-lever its pawl is caused to feed the platen forwardly in a well-known manner. The same result may be accomplished from the opposite end of the platen by depressing the outer end of the crank $o$, as the movement of the latter is transmitted to the feeding-pawl through the rotary platen-shaft and the radial arm $o^3$.

$o^7$ is a spring for returning the platen-shaft and connecting parts to their normal position upon releasing the crank $o'$ or the shifting-lever $o^4$. This spring is coiled around the cranked end of the platen-shaft and secured at one end to the same and at its other end to the adjacent end plate of the carriage-frame. In thus returning the parts the pawl rides over the teeth of the ratchet-wheel on the platen, ready to again turn the platen at the next depression of the crank or shifting-lever, the weight of the latter retaining the pawl in gear with the ratchet-wheel.

$p$ is a line-space gage for regulating the extent to which the platen is turned. This gage consists of a radial spring-arm arranged to turn on the right-hand end of the platen-shaft between the adjacent end plate of the carriage and the radial arm $o^3$ and extended backward and downward to form a thumb-piece or handle for adjusting it. This gage-arm is formed on its inner side near its free end with an inwardly-projecting lip or catch $p'$, adapted to interlock with one of three slots or recesses $p^2$, formed in the face of the opposing end plate. One of these recesses is exposed in Fig. 1, while the other two are concealed by the gage-arm and indicated by dotted lines, the catch of the gage-arm being in engagement with the middle recess.

$p^3$ is a stop or shoulder formed on the radial arm $o^3$, and $p^4$ is an outwardly-turned lip or stop formed on the gage-arm in the path of the said shoulder, against which the latter strikes, and thus limits the rotary movement of the platen and regulates the line-space accordingly.

By engaging the catch of the gage-arm in one or another of the three recesses $p^2$ the lines may be spaced to three different widths, the narrowest spacing being obtained by engaging the catch in the rear recess, the widest by engaging it in the front recess, and a spacing intermediate of these two by engaging it in the middle recess. This line-space movement of the platen may be effected from either end of the platen and at the same time that the carriage is drawn back for writing a new line.

$q$ is a curved detent-arm secured to the end plate $m^2$ and provided at its free end with a tooth or projection engaging with the ratchet-wheel of the platen, this tooth being preferably formed by indenting the outer face of the arm, as shown in Fig. 1. This detent prevents accidental movement of the platen, but permits the platen to be turned with slight force.

As the crank $o'$ is an integral part of the platen-shaft and the spacing-gage consists of but a single piece, no extra bearings are required, which enables this double line-space mechanism to be made of fewer parts than the usual single mechanism arranged at one end of the platen.

$r$ is a paper-holding rod arranged opposite the upper side of the platen and extending from end to end thereof, whereby the paper is held down over the printing-point. This rod is flattened on its upper front side and is graduated to serve also as a scale-bar, as shown in Fig. 3. In order to facilitate the insertion of the paper between the holding-rod and the platen, the rod is arranged to turn, so that its flat side may be brought opposite the platen to widen the space between the rod and the platen. For this purpose the rod is arranged at its end portions in openings or bearings formed in the upper portion of the end plates of the carriage, and one end of the rod, preferably its left-hand end, is formed with a steep spiral thread $r'$, which engages with a corresponding thread formed in its adjacent bearing, so that by pressing against either end of the rod the same is compelled to turn. The rod is pressed in the proper direction to turn its curved portion opposite the platen by a flat spring $r^2$, secured to the outer side of the end plate $m^3$ and bearing with its free end against the adjacent end of the rod. The rod is shifted in the opposite direction to turn its flat side toward the platen by a projection $r^3$, arranged on the shifting-lever $o^4$ in the proper position to strike the adjacent end of the rod and shift it upon swinging said lever to the upright position indicated by dotted lines in Fig. 4.

$r^4$ is a hook-shaped catch projecting from the upper end of the end plate $m^2$, with which the projection $r^3$ interlocks when the shifting-lever is swung upward and whereby the lever is locked in this position. In thus locking the lever the radial arm $o^3$ of the platen-shaft is depressed sufficiently to allow the projection to pass under the nose of the hook-shaped catch, and as this turning movement of the radial arm and platen-shaft strains the spring at the opposite end of the shaft the lifting-lever is yieldingly held in engagement with the catch. Upon swinging the shifting-lever down to the position shown by full lines in Fig. 4 the rod is released and the spring $r^2$ again forces it toward the right, and thus turns it in the proper direction to again bring the scale into view.

$r^5$ is a stop or shoulder arranged on the outer portion of the radial arm $o^3$, against which the projection $r^3$ strikes when the actuating-pawl $o^6$ is fully engaged with the ratchet-wheel of the platen and whereby the end thrust of the pawl against the ratchet-wheel is avoided.

S represents the paper-guide, which surrounds the front and bottom portions of the platen, its upper end terminating immediately in front of the printing-point and its lower portion being extended rearwardly and upwardly to form the paper-shelf S'. The curved portion of the paper-guide is attached at its ends to the front rail of the carriage by any suitable means, while its remaining portions are free to spring away from the platen.

$S^2$ is the feed-roller, running in contact with the lower rear side of the platen. The adjacent portion of the paper-guide is provided with a horizontal row of slots $s$, and the feed-roller is provided with annular grooves $s'$, arranged in line with the webs $s^2$, separating said slots, which grooves receive said webs and permit the salient ungrooved face of the feed-roller to project through these slots and bear against the surface of the platen. The feed-roller is mounted on a shaft $s^3$, passing axially through and journaled with its projecting ends in bearings $s^4$, secured to the end portions of the paper-guide, as shown in Fig. 4. The front portion of the guide directs the paper upward around the platen, and its upper edge is properly shaped to hold the paper smoothly against the upper side of the platen. This upper edge is formed with a number of recesses or apertures $s^5$ to render this part of the guide more flexible and enable the operator to observe when the lower end of the sheet approaches the printing-point.

$t$ $t'$ represent the ribbon-spools of the inking mechanism, which are arranged over the front portion of the platen on opposite sides of the center line of the machine.

T is the center ribbon-guide, which consists of a front guide-arm $t^2$ and rear guide-arm $t^3$. This center guide is carried by a standard $t^4$, secured to a transversely-movable reversing-bar $t^5$ and sliding in guides $t^6$, suitably supported from the main frame of the machine.

$t^7$ $t^8$ are horizontal guides arranged on opposite sides of the center guide and secured to the under side of the type-bar segment D. The ribbon $t^9$ passes downwardly from the spool $t$, thence under the guide $t^7$, thence under and over the front center guide $t^2$, thence rearwardly under and over the rear center guide $t^3$, and thence laterally and upwardly to the other ribbon-spool. The ribbon-spools are secured to the extended hubs of the ratchet-wheels $u$ $u'$, which are journaled on arbors arranged at the upper ends of standards $u^2$.

$u^3$ $u^4$ are actuating-pawls extending upwardly and backwardly from the side arms $u^5$ of the universal bar $H^2$, so as to take part in the movements of the latter, and adapted to engage with the ratchet-wheels of the ribbon-spools, respectively. These spring-pawls consist, preferably, of spring-bars pivoted at their lower ends to the arms $u^5$ of the universal frame. The shanks of these actuating-pawls pass through slots or loops $u^6$, formed in the enlarged ends of the reversing-bar $t^5$. When the reversing-bar is shifted to either extremity of its movement, one of the actuating-pawls is thrown into gear with its ratchet-wheel and the other pawl is thrown out of gear with its ratchet-wheel. The reversing-bar is held in either of these positions by a spring-catch $u^7$, secured to a stationary part of the machine and engaging with either of two locking-notches $u^8$ $u^9$, formed in the under side of the reversible bar at its middle portion, as shown in Fig. 5.

$u^{10}$ $u^{11}$ represent detents engaging, respectively, with the ratchet-wheels of the ribbon-spools for preventing backward movement of the latter. These detents are formed on upwardly and rearwardly extending arms secured at their lower ends to the reversible bar $t^5$.

$v$ $v'$ represent shifting-arms for reversing the bar $t^5$, which are operated by the enlargement of the coils of ribbon on the one or the other of the ribbon-spools. These shifting-arms are arranged on the outer sides of the ribbon-spools, respectively, and consist of flat upright springs which are pivoted at their lower ends to the main frame of the machine, so as to be capable of lateral movement, and which pass through slots $v^2$, formed in the enlarged ends of the reversing-bar on the outer sides of the slots through which the actuating-pawls pass. Each of the shifting-arms carries at its upper free end a small antifriction-roller adapted to bear against the periphery of the ribbon coils on the ribbon-spools. The several parts of the reversing mechanism are so arranged that when the reversing-bar is shifted toward the left the right-hand actuating-pawl and detent engage with the ratchet-wheel of the adjacent ribbon-spool, so that the latter is turned the distance of a tooth at every depression of the universal bar or frame, while the actuating-pawl and detent of the other ribbon-spool are out of gear. In this position of the parts the roller of the right-hand shifting-arm $v$ bears against the periphery of the ribbon coil on the adjacent spool, and as this coil increases in diameter the spring shifting-arm is gradually tensioned until its power is sufficient to force the locking-catch out of the notch of the reversing-bar, when it reacts and straightens and shifts the reversing-bar in the opposite direction until the other notch of the bar arrives opposite the locking-catch and again locks the bar. This automatic reversal of the sliding bar causes the right-hand actuating-pawl and detent to recede out of engagement with the ratchet-wheel of the full spool and the right-hand shifting-arm to move out of contact with the latter, and causes the actuating-pawl and detent of the left-hand spool to engage with the ratchet-wheel of the latter and the left-hand shifting-arm to bear with its roller against the ribbon on the adjacent spool. The ribbon accumulating on the latter gradually strains the left-hand shifting-arm until its tension overcomes the locking-catch, when the operation of automatically reversing the ribbon-feed is repeated. The ribbon is thus fed back and forth from one spool to the other without requiring any attention on the part of the operator.

In Figs. 5 and 6 the ribbon is represented as nearly all wound on the right-hand spool and just about to be reversed, and in Figs. 3 and 4 it is represented as it appears just after being reversed.

As the center guide is carried by the reversing-bar, it is shifted laterally with the bar, and the position of the portion of the ribbon between the front and rear guides $t^2$ $t^3$ is therefore changed at every reversal of the bar. Both edge portions of the ribbon are thus utilized, and the ribbon requires no attention from the time it is attached to the spools until it becomes necessary to renew it.

As shown in Fig. 3, the left-hand portion of the ribbon is over the printing-point, which latter is represented by a broken line, and in this position of the ribbon each letter is visible to the operator the instant that it is printed, while in the position of the ribbon shown in Fig. 6 the right-hand portion of the ribbon is over the printing-point, so that a number of letters are always concealed by the left-hand portion of the ribbon and do not come into view until about the third impression thereafter.

If it is desired to have the left-hand portion of the ribbon at all times above the printing-point, as shown in Fig. 3, this may be done by attaching the center guide to a stationary part of the machine in the position shown in said figure, so as not to be affected by the movements of the reversing-bar $t^5$. For this purpose the buffer-support is provided with a perforated ear $t^{10}$, to which the guide may be fastened by the same screw whereby it is secured to its standard $t^4$ on the reversing-bar. As only the left-hand edge of the ribbon is used in this arrangement of the center guide, it is necessary in order to utilize both edges of the ribbon to change the spools, so as to bring the unused portion of the ribbon over the printing-point.

W is the space-bar, and W' the lever, to which the bar is secured. This lever is pivoted near its rear portion to the post $d$, and its rear arm is arranged to operate the escapement device of the carriage-feed independently of the universal frame. This space-lever is arranged above the universal frame and is recessed on its under side, as shown in Fig. 2, so as to clear the latter and not actuate it when the bar is depressed. By thus operating the space-bar independently of the universal frame the ribbon-feed, which is actuated only by the universal frame, is not affected by the movements of the space-bar, thus avoiding unnecessary wear of the parts of the ribbon-feeding mechanism and wearing the ribbon uniformly.

$w^2$ is the spring whereby the space-lever is elevated to its normal position when released, and which consists of a lower member secured to the front cross-bar $g^2$ of the main frame and an upper arm bearing against the space-lever.

$w^3$ represents the corresponding elevating-springs of the upper bank of key-levers, and $w^4$ the springs of the lower bank of key-levers. Each of the latter springs consist of two forwardly-extending arms, which bear with their outer ends against two adjacent key-levers, respectively. These arms are connected at their rear portions by a cross-bar $w^5$ and are provided a short distance in front of this cross-bar with coils $w^6$. The base-plate A is provided near its front edge with a series of U-shaped slots, forming tongues $w^7$, under which the connecting-bars $w^5$ of the duplex springs engage, the base-plate being grooved or recessed on its under side opposite said tongues, as shown in Fig. 2, to form seats for the connecting-bars of the spring-arms.

The coils $w^6$ are arranged to bear against the front edge of the base-plate, and thus form stops which retain said connecting-bars in engagement with the tongues $w^7$ without requiring any additional fastening.

The springs of the left bank of key-levers are constructed in all respects like those just described, the only difference being that they extend rearward from the upper frame-bar $g^4$, which latter is formed at its lower end with a rearwardly-projecting flange, which is slotted to form the tongues with which the cross-bars of the springs interlock. This construction permits the springs to be quickly applied and reduces the number of parts.

Y Y' are shields which are arranged on opposite sides of the cover H and which cover the front offsets of the key-levers.

Y² Y³ are curved rods or bars connecting the cover of the keyboard with the rear portion of the main frame and forming convenient handles for lifting the machine. The adjacent rear portions of the shields Y Y' are recessed or cut away, as shown in Fig. 3, to form openings for the fingers in grasping these handles.

I claim as my invention—

1. The combination with the platen, of two sets of alternating type-bars having thin body portions and thickened pivot portions, and a supporting-segment having guide-slots, the inner portions of which are narrow and receive the body portions of the type-bars and the outer portions of which are wider and receive the thick pivot portions of the bars, substantially as set forth.

2. The combination with the platen, and a supporting-segment provided with radial guide-slots, having narrow inner portions and wide outer portions, of separate pivot-wires arranged one in advance of the other and intersecting said guide-slots, and independent groups of type-bars mounted on said pivot-wires respectively, each type-bar having a thin body portion and a thickened pivot portion and the bars of one group alternating with those of the other group, substantially as set forth.

3. The combination with the type-bars and their support, of a pivot-wire passing through openings in the hubs of the type-bars and in said support, capable of being shifted lengthwise in said support for bringing different portions thereof within the pivot-holes of the type-bars, and having screw-threaded ends, and adjusting-nuts applied to the threaded ends of said wire and bearing against said support, substantially as set forth.

4. The combination with the platen and the slotted supporting-segment, of independent pivot-wires arranged one in advance of the other and intersecting said slots, and independent sets of type-bars pivoted in said slots and having crank-arms, the arms of one set of type-bars having notches which engage over the pivot-wire of the adjacent set, substantially as set forth.

5. The combination with the frame of the machine and a type-bar, of a key-lever having angular end portions which are pivoted to the frame, the intermediate body portion of the lever being offset with reference to said end portions throughout its length and a connection extending from said type-bar to the body portion of the key-lever, substantially as set forth.

6. The combination with the frame of the machine and a type-bar, of a key-lever having angular or offset end portions which are pivoted to the frame, the intermediate body portion of the lever being offset with reference to said end portions throughout its length, a key connected with the offset body portion of said lever and a connection extending from the body portion of said lever to said type-bar, substantially as set forth.

7. In a type-writing machine, the combination with the key-lever, of a split tubular shank attached to the lever and having an internal screw-thread and a key having a screw-threaded stem engaging with the internal thread of said split shank, substantially as set forth.

8. The combination with the platen and the type-bars, of a rebounder normally intercepting the type-bars but allowing the type on the bars to strike the platen, a normally rigid support carrying said rebounder and capable of vertical movement, whereby the rebounder may be raised above its normal position, and a retaining device whereby the rebounder is held in said abnormal position, substantially as set forth.

9. The combination with the platen and its carriage, the type-bars and the key-levers, of a vertically-movable rebounder intercepting the type-bars and a lifting device whereby the rebounder is automatically elevated when the carriage reaches the end of its movement, substantially as set forth.

10. The combination with the platen and its carriage, the type-bars and the key-levers, of a vertically-movable rebounder intercepting the type-bars, a spring tending to raise the rebounder above its normal height, a catch for holding the rebounder in its normal position, and a releasing device connected with the carriage, whereby said catch is released, substantially as set forth.

11. The combination with the platen and its carriage, the type-bars and their operating-levers, of a horizontal rebounder intercepting the type-bars and having a notched guide-rod, a spring tending to elevate said rebounder, a detent engaging with the notched guide-rod for holding the rebounder in its lowered position, and a trip device arranged on the carriage and adapted to release said detent, substantially as set forth.

12. The combination with the platen and its carriage, the type-bars and the key-levers, of a vertically-movable rebounder intercepting the type-bars, an elevating device whereby the rebounder is raised above its normal height when the carriage reaches the end of its movement, and a return device connected with the carriage, whereby the rebounder is automatically depressed upon returning the carriage to its initial position, substantially as set forth.

13. The combination with the platen and its carriage, the type-bars and their operating-levers, of a rebounder intercepting the type-bars and capable of rising above its normal height, means for elevating the rebounder to such abnormal height when the carriage reaches the end of its movement, and a lever for lowering the rebounder to its normal position, substantially as set forth.

14. The combination with the platen-carriage, the type-bars and their operating-levers, of an intercepting device for preventing the type-bars from reaching the platen when the carriage reaches the end of its movement, and a stop connected with said intercepting device, adapted to engage against the carriage and arrest its movement, substantially as set forth.

15. The combination with the platen and its carriage, the type-bars and their operating-levers, of a movable intercepting device arranged in the path of the type-bars and having a guide-rod, and a stop-rod extending rearwardly from said guide-rod, and adapted to arrest the movement of the carriage, means for elevating said intercepting device, a depressing-lever engaging with said guide-rod, and a key-lever connected with said depressing-lever, substantially as set forth.

16. The combination with the platen and its carriage, the type-bars and the key-levers, of a vertically-movable rebounder intercepting the type-bars, an elevating device whereby the rebounder is raised above its normal height when the carriage reaches the end of its forward movement, a locking device for holding the rebounder in its depressed position, a trip device arranged on the carriage, and a pivoted inclined tooth connected with the rebounder and arranged in the path of said trip device when the rebounder is elevated, said tooth yielding in one direction but being rigid in the opposite direction, substantially as set forth.

17. In a type-writing machine, the combination with the platen, of an elastic rebounding device, and type-bars adapted to strike said rebounding device and having impact faces of different areas, whereby the latter offers a correspondingly greater or less resistance to the type-bars, substantially as set forth.

18. In a type-writing machine, the combination with the carriage having a step-by-step feed movement, of a device for shifting the carriage backward, a lever connected with said shifting device for operating the same, and stops which limit the movement of the lever when the carriage is set back either a whole space or half a space, substantially as set forth.

19. In a type-writing machine, the combination with the carriage having a step-by-step feed movement, of a device for shifting the carriage backward, a lever for operating said shifting device and a guide for said lever having a stop for limiting the movement of the carriage when the carriage is set back half a letter-space, and a second stop for limiting the movement of said lever when the carriage is set back a whole space, substantially as set forth.

20. The combination with the carriage having a ratchet-bar, of a set-back pawl adapted to engage with said ratchet-bar, and capable of moving lengthwise of said bar, and a shifting-lever interlocking with said pawl, substantially as set forth.

21. The combination with the carriage having a ratchet-bar, of a set-back pawl adapted to engage with said ratchet-bar, and capable of moving lengthwise of said bar, a shifting-lever interlocking with said pawl, and a key-lever connected with said shifting-lever, substantially as set forth.

22. The combination with the carriage having a ratchet-bar, of a set-back pawl adapted to engage with said bar and capable of sliding lengthwise thereof, a shifting-lever interlocking with said pawl for moving it backward, and a spring for retracting the pawl, substantially as set forth.

23. The combination with the carriage having a ratchet-bar, of a set-back pawl adapted to engage with said bar and capable of sliding lengthwise thereof, a shifting-lever having a spur interlocking with said pawl and a cam whereby the pawl is moved into engagement with said rack-bar, a spring for retracting the pawl, and a key-lever connected with said shifting-lever, substantially as set forth.

24. In a type-writing machine, the combination with the platen and the ribbon-spools and their intermittent feed mechanism, of a reversing-bar for alternating the feed of the ribbon from one spool to the other and a ribbon-guide mounted upon said bar opposite the printing-point, over which the ribbon passes, whereby both edge portions of the ribbon are brought over the printing-point by the movement of the reversing-bar, substantially as set forth.

25. In a type-writing machine, the combination with the platen, the type-bars and the universal bar or frame, of ribbon-spools arranged on opposite sides of the printing-point, actuating-pawls connected with the universal bar or frame and adapted to engage alternately with the ribbon-spools, a sliding reversing-bar controlling said pawls and having loops or apertures, and shifting-arms adapted to bear against the periphery of the ribbon-coils upon said spools and passing through the loops of the reversing-bar, substantially as set forth.

26. In a type-writing machine, the combination with the platen, the type-bars and the universal bar or frame, of ribbon-spools arranged on opposite sides of the printing-point, actuating-pawls connected with the universal bar or frame and adapted to engage alternately with the ribbon-spools, a sliding reversing-bar controlling said pawls and having loops or apertures, and flexible shifting-arms adapted to bear with their free portions against the ribbon-coils on said spools and passing through the loops or apertures of the reversing-bar, substantially as set forth.

27. In a type-writing machine, the combination with the platen, the type-bars and the universal bar or frame, of ribbon-spools arranged on opposite sides of the printing-point, actuating-pawls connected with the universal bar or frame and adapted to engage alternately with the ribbon-spools, a sliding reversing-bar controlling said pawls and operated by the enlargement of the ribbon-coils of the spools, and a yielding catch for holding said reversing-bar in place, substantially as set forth.

28. In a type-writing machine, the combination with the carriage and the rotary platen, of a shaft passing axially through the platen and capable of turning in the same, a device for turning said shaft, arranged at one end thereof and a shifting device arranged at the opposite end of said shaft and engaging with the platen, substantially as set forth.

29. In a type-writing machine, the combination with the carriage and the platen, of an axle for the platen passing loosely through the latter, journaled on the carriage, and provided at both ends with cranks or levers for turning it, and a connection whereby the movement of the axle is transmitted to the platen, substantially as set forth.

30. In a type-writing machine, the combination with the carriage and the platen provided at one end with a toothed rim, of an axle, passing loosely through the platen and having at one end a device for turning it, and a radial arm attached to the other end of the axle and carrying an actuating-pawl which engages with the toothed rim of the platen, substantially as set forth.

31. In a type-writing machine, the combination with the carriage and the rotary platen, of a shaft passing axially through the platen and capable of turning backwardly in the same, a connection whereby the platen is caused to turn forwardly with the axle, and a spring whereby the axle is returned to its normal position, substantially as set forth.

32. In a type-writing machine, the combination with the carriage and the platen provided at one end with a toothed rim, of an axle passing loosely through the platen and having at one end a device for turning it, a radial arm attached to the other end of the axle and carrying an actuating-pawl which engages with the toothed rim of the platen, and a spiral return-spring secured at one end to the axle of the platen and at its other end to the carriage, substantially as set forth.

33. The combination with the carriage and the platen, of an axle passing loosely through the platen and journaled on the carriage, a crank arranged at one end of said axle, a shifting device attached to the other end of the axle and engaging with the platen, a detent device for preventing backward movement of the platen and a spring for returning the platen-axle to its normal position, substantially as set forth.

34. The combination with the carriage-frame having a number of locking-recesses, of the platen and its shifting device, and an elastic stop-arm pivoted concentrically with the platen and having a projection adapted to engage in one of said locking-recesses, substantially as set forth.

35. The combination with the carriage and the platen, of a rotary scale-bar of round cross-section flattened on one side and having a spiral screw-thread engaging in a threaded bearing on the carriage, and a lever pivoted to the carriage and adapted to bear against one end of said scale-bar, substantially as set forth.

36. The combination with the carriage and the platen, of a rotary scale-bar of round cross-section flattened on one side and having a spiral screw-thread engaging in a threaded bearing on the carriage, a lever pivoted to the carriage and adapted to bear against one end of said scale-bar, and a spring for returning the bar to its normal position, substantially as set forth.

37. The combination with the main frame of the machine provided with a U-shaped slot forming a projecting tongue, of a pair of key-levers, and a duplex elevating-spring having arms bearing against said key-levers respectively and connected at their rear ends by a bar interlocking with said tongue and provided in front of said bar with a stop bearing against the main frame, whereby said connecting-bar is locked in place, substantially as set forth.

Witness my hand this 15th day of April, 1893.

EMMIT G. LATTA.

Witnesses:
C. J. RICE,
H. F. KLEE.